United States Patent
Basso et al.

(10) Patent No.: US 12,314,566 B2
(45) Date of Patent: May 27, 2025

(54) READ DISTURB MANAGEMENT FOR MEMORY

(71) Applicant: Micron Technology, Inc., Boise, ID (US)

(72) Inventors: Francesco Basso, Portici (IT); Francesco Falanga, Quarto (IT); Alberto Sassara, Naples (IT); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/931,416

(22) Filed: Sep. 12, 2022

(65) Prior Publication Data

US 2024/0086070 A1    Mar. 14, 2024

(51) Int. Cl.
*G06F 3/06* (2006.01)

(52) U.S. Cl.
CPC .......... *G06F 3/0611* (2013.01); *G06F 3/0629* (2013.01); *G06F 3/0673* (2013.01)

(58) Field of Classification Search
CPC ............... G06F 11/1016; G06F 3/0659; G06F 11/0751; G06F 11/0772; G06F 3/0614; G06F 3/0629; G06F 3/0673; G06F 3/0611; G06F 3/061; G06F 3/0604; G06F 11/142
USPC ......... 711/103, 12.008, 154, 12.001, 12.084, 711/170
See application file for complete search history.

(56) References Cited

U.S. PATENT DOCUMENTS

| | | | | |
|---|---|---|---|---|
| 9,952,781 | B2* | 4/2018 | Orme | G06F 12/0238 |
| 10,373,695 | B2* | 8/2019 | Barndt | G06F 3/0647 |
| 2008/0313494 | A1* | 12/2008 | Hummler | G11C 29/50016 714/E11.054 |
| 2011/0302445 | A1* | 12/2011 | Byom | G11C 29/883 711/170 |
| 2014/0029336 | A1* | 1/2014 | Venkitachalam | G11C 16/06 365/185.09 |
| 2015/0193299 | A1* | 7/2015 | Hyun | G11C 29/028 714/6.24 |
| 2016/0253112 | A1* | 9/2016 | Chen | G06F 11/1072 714/6.21 |
| 2018/0033491 | A1* | 2/2018 | Marelli | G11C 16/26 |
| 2018/0074701 | A1* | 3/2018 | Chang | G06F 3/0688 |
| 2020/0233605 | A1* | 7/2020 | Boenapalli | G11C 16/3418 |
| 2020/0363993 | A1* | 11/2020 | Choi | G06F 3/065 |

* cited by examiner

*Primary Examiner* — Yaima Rigol
*Assistant Examiner* — Edward Waddy, Jr.
(74) *Attorney, Agent, or Firm* — Holland & Hart LLP

(57) ABSTRACT

Methods, systems, and devices for read disturb management for memory are described. In some instances, data may be read from a first page of a virtual block of a memory system. If the data includes one or more errors, the memory system may read data from a second page of the virtual block and determine whether one or more errors exist in the data. The memory system may continue reading pages of the virtual block until a page includes no (or relatively few errors). The memory system may then refresh the pages.

22 Claims, 6 Drawing Sheets

READ DISTURB MANAGEMENT FOR MEMORY

FIELD OF TECHNOLOGY

The following relates to one or more systems for memory, including read disturb management for memory.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

In some examples, reading one or more memory cells may affect (e.g., disturb) nearby or adjacent memory cells. For example, during a read operation, a word line of a block of memory cells may be driven to a voltage (e.g., a read voltage) to read one or more memory cells coupled with the word line. In some instances, driving the word line to the voltage may affect a threshold voltage of one or more memory cells in a same block of memory cells. That is, a threshold voltage of one or more unselected memory cells of the block may inadvertently shift during the read operation. Accordingly, a memory system may periodically refresh the block of memory cells to mitigate or prevent errors caused by the shifted threshold voltages. However, other different memory systems perform refresh operations at a block-level (e.g., on a virtual-block-level), which may add latency to the refresh operation because the memory system is refreshing at a larger granularity than may be required. Accordingly, a memory system configured to perform refresh operations on a more granular basis (e.g., different from the other different memory systems that perform refresh operations at the block-level) may be desirable.

A memory system configured to perform refresh operations on a page-level (e.g., on a virtual-page-level) is described herein. In some instances, a memory system may detect one or more errors when reading data from a first page (e.g., a first virtual page) of a block of memory cells. Because it is likely that adjacent pages (e.g., pages directly adjacent to the first page, pages in a near proximity to the first page such as pages stored within a threshold quantity of the first page) may similarly include errors, the memory system may read data from the adjacent pages to determine the existence of errors. The memory system may continue reading data from adjacent pages until no errors are detected (or until a quantity of errors below a threshold value is detected) and may refresh the pages including errors. Accordingly, the memory system may refresh select pages needing to be refreshed, as opposed to refreshing the entire block of memory cells, which will improve the overall latency of the memory system.

Figure 1:
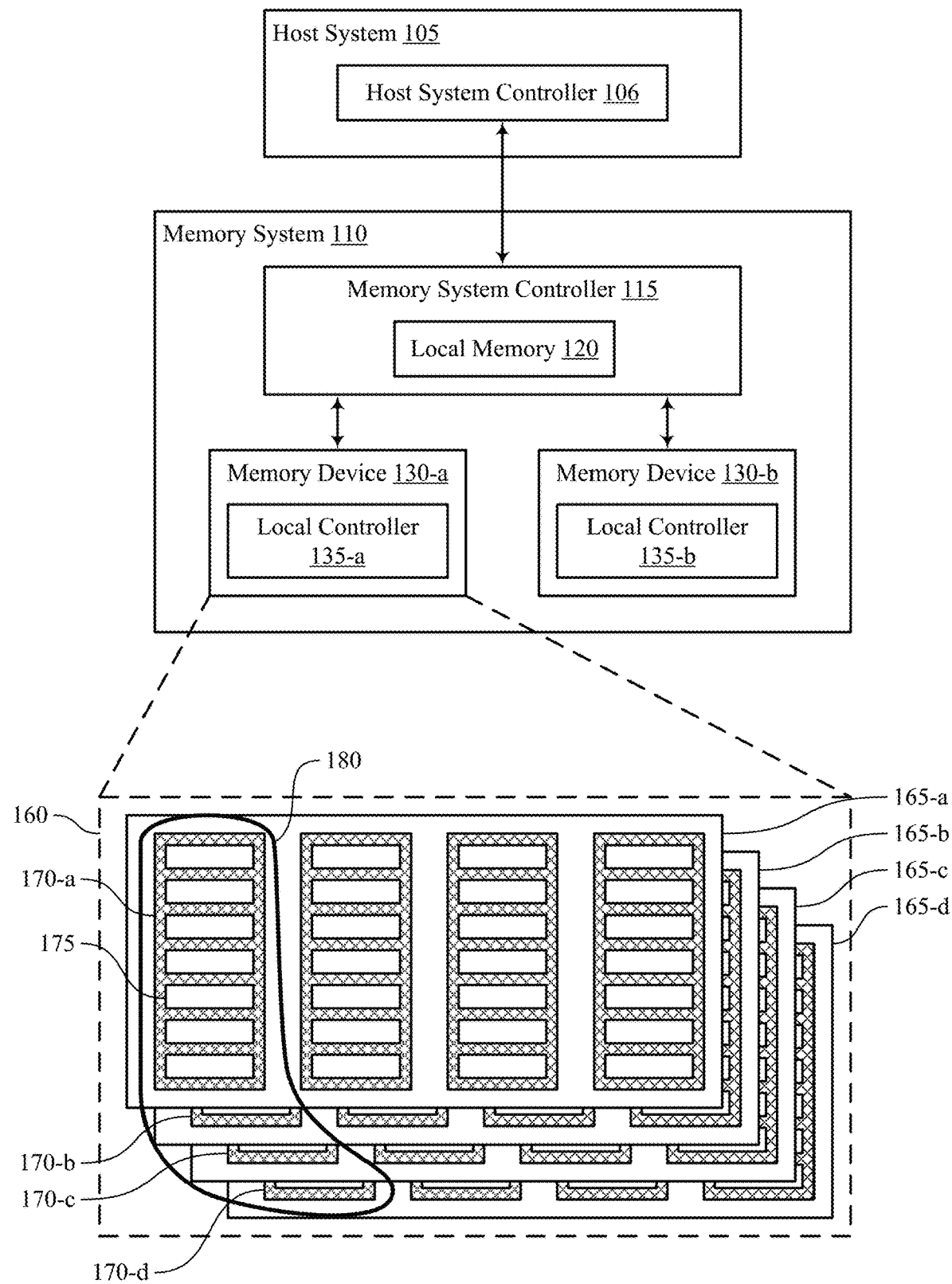
FIG. 1 illustrates an example of a system that supports read disturb management for memory in accordance with examples as disclosed herein.
Figure 2:
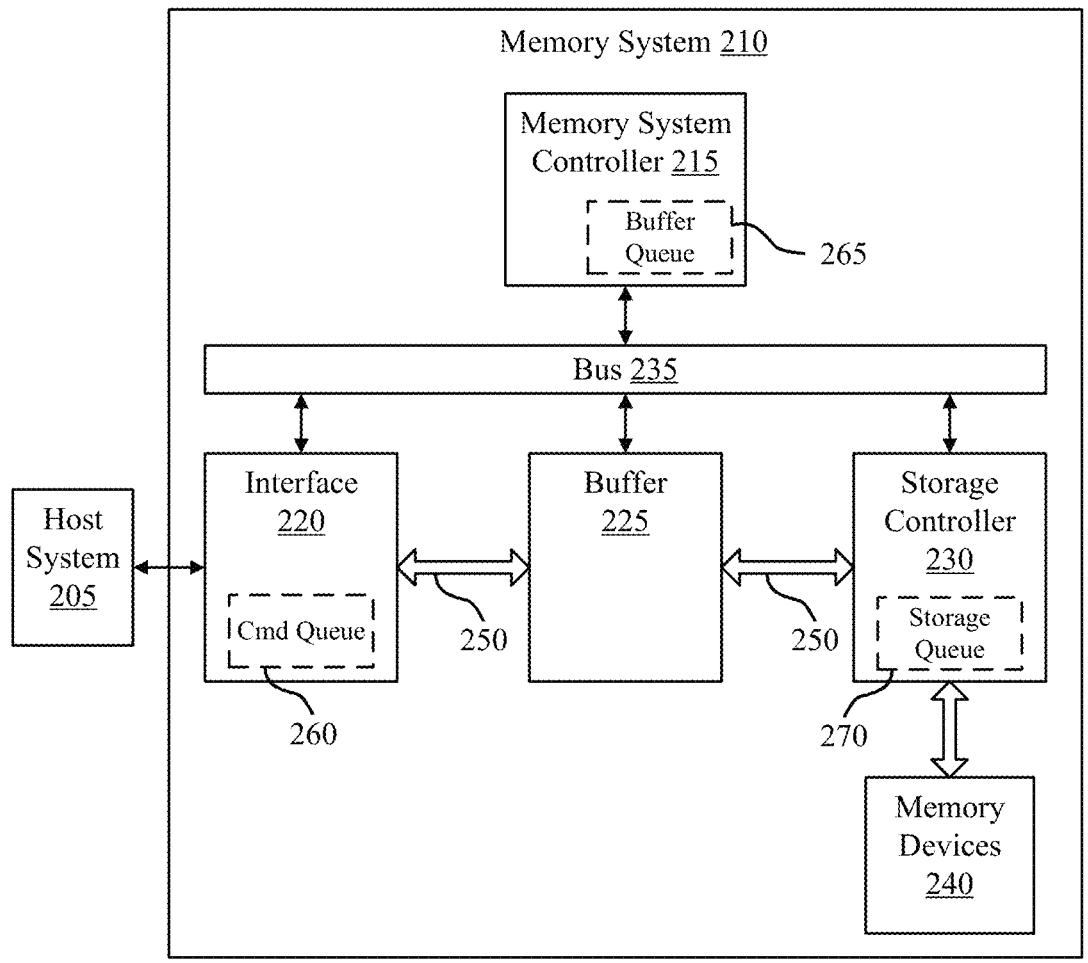
FIG. 2 illustrates an example of a system that supports read disturb management for memory in accordance with examples as disclosed herein.

Features of the disclosure are initially described in the context of systems, devices, and circuits with reference to FIGS. 1 through 2. Features of the disclosure are described in the context of systems and process flow diagrams with reference to FIGS. 3 and 4. These and other features of the disclosure are further illustrated by and described in the context of an apparatus diagram and flowcharts that relate to read disturb management for memory with reference to FIGS. 5 through 6.

FIG. 1 illustrates an example of a system 100 that supports read disturb management for memory in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open not-and (NAND) Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system. The system 100 may include any quantity of non-transitory computer readable media that support read disturb management for memory. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some instances, the memory system 110 may detect an error when reading data from a first page 175 (e.g., a first virtual page) of a block 170 of memory cells. For example, the memory system controller 115 may read data from the first page 175 and may detect an error associated with the data. Because it is likely that adjacent pages 175 (e.g., pages directly adjacent to the first page 175, pages in a near proximity to the first page 175 for example as pages stored within a threshold quantity of the first page such as one page or multiple pages) may similarly include errors, the memory system 110 (e.g., the memory system controller 115) may read data from the adjacent pages 175 to determine the existence of errors. The memory system 110 (e.g., the memory system controller 115) may continue reading data from adjacent pages 175 until no errors are detected (or until a quantity of errors below a threshold value is detected) and may refresh the pages 175 including errors. Accordingly, the memory system 110 may refresh only those pages 175 needing to be refreshed, as opposed to refreshing the entire block 170 of memory cells, which may improve the overall latency of the memory system 110.

FIG. 2 illustrates an example of a system 200 that supports read disturb management for memory in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some instances, the memory system 210 may detect an error when reading data from a first page (e.g., a first virtual page) of a block of memory cells. For example, the memory system controller 215 may read data from the first page and may detect an error associated with the data. Because it is likely that adjacent pages (e.g., pages directly adjacent to the first page, pages in a near proximity to the first page) may similarly include errors, the memory system 210 (e.g., the memory system controller 215) may read data from the adjacent pages to determine the existence of errors. The memory system 210 (e.g., the memory system controller 215) may continue reading data from adjacent pages until no errors are detected (or until a quantity of errors below a threshold value is detected) and may refresh the pages including errors. Accordingly, the memory system 210 may refresh only those pages needing to be refreshed, as opposed to refreshing the entire block of memory cells, which may improve the overall latency of the memory system 210.

Figure 3:
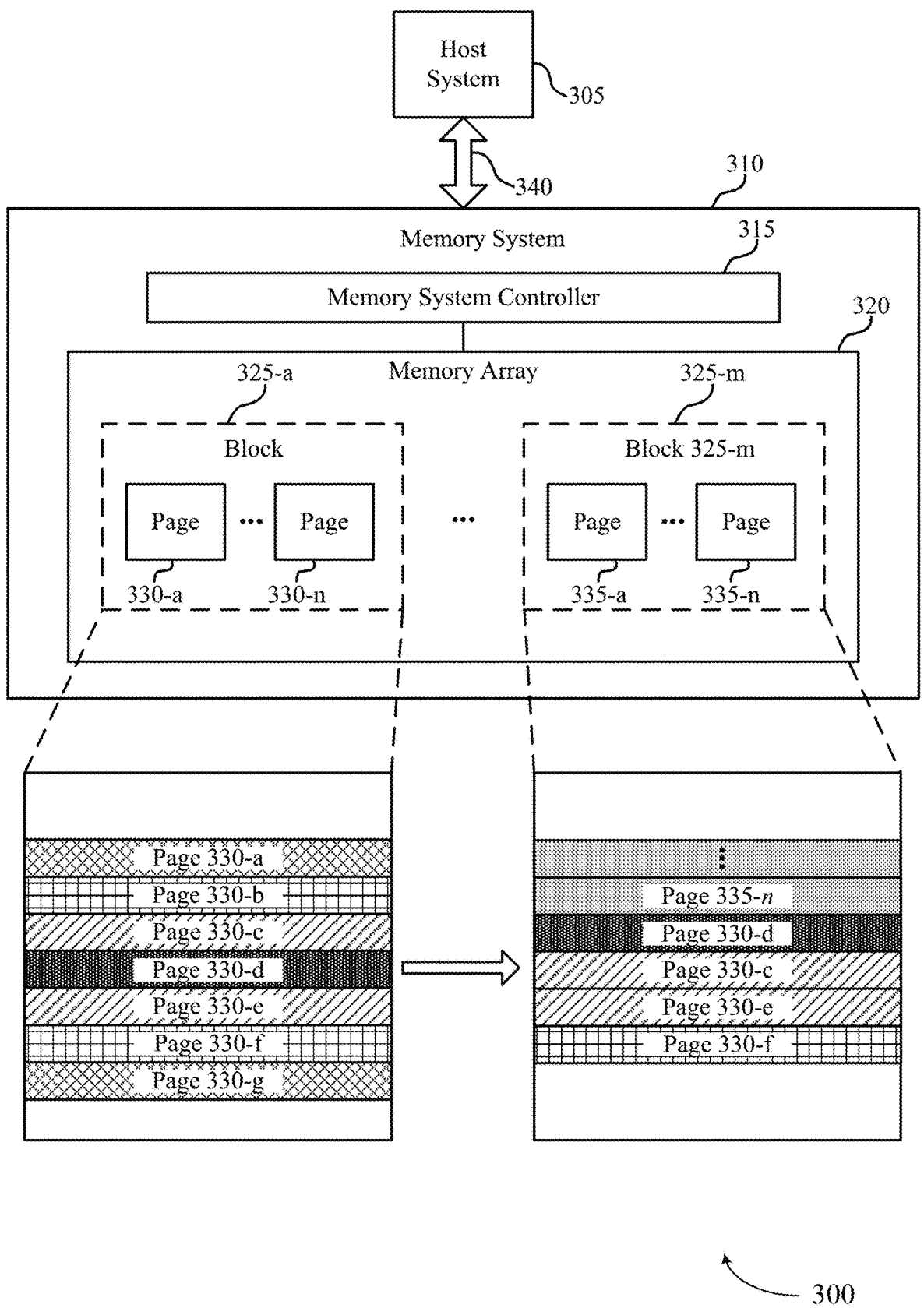
FIG. 3 illustrates an example of a system that supports read disturb management for memory in accordance with examples as disclosed herein.

FIG. 3 illustrates an example of a system 300 that supports read disturb management for memory in accordance with examples as disclosed herein. The system 300 may include a host system 305 and a memory system 310. In some cases, the host system 305 and the memory system 310 may represent a host system 105 or 205 and a memory system 110 or 210, respectively, as described with reference to FIG. 1. In some examples, the host system 305 may be coupled with the memory system 310 via an interface 340. In some instances, the memory system controller 315 may perform refresh operations on the blocks 325 of the memory array 320. For example, the memory system controller 315 may refresh only those pages 330 needing to be refreshed, as opposed to refreshing the entire block 325 of memory cells, which may improve the overall latency of the memory system 310.

The memory system 310 may include a memory array 320 that includes one or more blocks 325. For example, the memory array 320 may include at least a block 325-*a* through a block 325-*m*, and any quantity of intervening blocks 325 in between. Each of the blocks 325 may include one or more pages. For example, the block 325-*a* may include page 330-*a* through page 330-*n*, and the block 325-*m* may include page 335-*a* through page 335-*n*.

In some instances, the blocks 325 may represent one or more physical blocks of memory cells. A virtual block may refer to a group of one or more blocks 325 (e.g., a group of one or more physical blocks) within which concurrent operations may occur. For example, concurrent operations may be performed on one or more of blocks 325-*a* through 325-*m*, and such blocks may collectively be referred to as a virtual block. As described herein, the block 325-*a* may be associated with a virtual block.

In some examples, the memory system controller 315 may be coupled with the memory array 320 and may receive commands from the host system 305 (e.g., via the interface 340). The memory system controller 315 may perform various operations associated with the memory system 310. For example, the memory system controller 315 may receive commands (e.g., read commands, write commands) from the host system 305, and read and write data corresponding to memory cells of the pages 330 and the pages 335 of the blocks 325 in response to receiving the commands, among other operations. In some cases, the memory system controller 315 may be configured to read data from one or more pages (e.g., pages 330 or pages 335) of the blocks 325, determine whether data stored to the pages contain one or more errors, and perform one or more refresh operations on the pages as described herein based on or in response to determine whether data stored to the pages contain one or more errors.

The memory system controller 315 may receive a read command from the host system 305. For example, the memory system controller 315 may read a first page 330-*d* of the block 325-*a* based on receiving the read command. In some examples, the memory system controller 315 or another component of the memory system 310 (e.g., error detection circuitry, error correction circuitry, or other circuitry or logic) may determine whether the data read from the first page 330-*d* contains any errors. In some instances, the data may not contain any errors and the memory system controller 315 may continue performing other operations (e.g., read operations, write operations) after reading the first page 330-*d*. In other instances, the first page 330-*d* may include one or more errors and the memory system controller 315 may read one or more adjacent pages (e.g., page 330-*c*, page 330-*e*) to determine whether data stored to the pages include any errors.

In some cases, the one or more errors in the first page 330-*d* may be caused by read disturb as described herein. For example, previous read operations on the first page 330-*d* may have inadvertently adjusted a threshold voltage of one or more memory cells included in adjacent pages. Accordingly, the memory system controller 315 may read one or more adjacent pages (e.g., page 330-*c*, page 330-*e*) to determine whether data stored to the pages include any errors In some examples, the memory system controller 315 may read adjacent pages 330 in response to determining one or more errors in the first page 330-*d*. For example, the memory system controller 315 may read data stored to one or more memory cells of the pages 330 adjacent to the first page 330-*d*, such as a second page 330-*c*. In some examples, the memory system controller 315 may continue to read adjacent pages until a page contains no (or relatively few) errors. For example, the memory system controller 315 may detect one or more errors in the second page 330-*c*, and may proceed to reading data from a third page 330-*b*. In some examples, the memory system controller 315 may detect no (or relatively few) errors in the data stored to the third page 330-*b*, and may thus stop reading pages adjacent to the page 330-*b*.

In some cases, the memory system controller 315 may continue to read other adjacent pages in another direction, including pages 330-*e*, 330-*f*, and 330-*g* until no (or relatively few) errors or few errors are detected. In some examples, the memory system controller 315 may detect no (or relatively few) errors in the page 330-*e* and may stop reading adjacent pages 330. By way of another example, the memory system controller 315 may detect errors in the page 330-*e* and the page 330-*f*, but may detect no (or relatively few) errors in the page 330-*g*. In some cases, the memory system controller 315 may read the adjacent pages 330 in any order beginning with the pages 330 nearest to the first page 330-*d*. In some examples, the memory system controller 315 may refrain from reading adjacent pages 330 if no errors or a low quantity of errors are detected in the first page 330-*d*.

In some examples, the memory system controller 315 may stop reading adjacent pages 330 once one or more metrics satisfies a respective threshold. For example, when reading data from a respective page 330, the memory system controller 315 may determine a quantity of errors or a bit error rate (BER) associated with each page 330. Additionally or alternatively, the memory system controller 315 may determine a quantity of access operations (e.g., a quantity of read operations) performed on each page 330.

As described herein, the memory system controller 315 may compare a quantity of errors or a BER to a threshold $Th_y$ (e.g., an error threshold, a correctable error (CECC) threshold). For example, the memory system controller 315 may compare a quantity of errors to a first threshold and may compare a BER to a third threshold as described herein. By way of example, $Th_y$ may be set to one (1) error and the memory system controller 315 may determine a quantity of errors associated with the data read from the first page 330-d. If the quantity of errors satisfies the first threshold (e.g., if the quantity of errors is greater than or equal to one), the memory system controller 315 may proceed to reading data from the second page 330-c. As an additional example, $Th_y$ may be set to a BER of zero (0) and the memory system controller 315 may determine a BER associated with the data read from the first page 330-d. If the BER satisfies the third threshold (e.g., if the BER is greater than zero), the memory system controller 315 may proceed to reading data from the second page 330-c. The memory system controller 315 may subsequently read data stored to adjacent pages 330 until determining that the quantity of errors or BER for a page 330 does not satisfy $Th_y$ (e.g., until the quantity of errors is less than one or until the BER equals zero).

Additionally or alternatively, the memory system controller 315 may compare a quantity of access operations performed on a page 330 to a first threshold $Th_x$ (e.g., an access threshold). By way of example, $Th_x$ may be set to five million (5,000,000) reads and the memory system controller 315 may determine a quantity of access operations performed on the first page 330-d. That is, the memory system controller 315 or other circuitry included in the memory system 310 may include a counter configured to track a quantity of access operations performed on each block 325, each page 330, or both. If the quantity of access operations satisfies the second threshold (e.g., if the quantity of access operations performed on the first page 330-d is greater than or equal to five million), the memory system controller 315 may proceed to reading data from the second page 330-c. In other examples, the second threshold may be used in conjunction with the first threshold. For example, if both the first and second thresholds are satisfied, the memory system controller 315 may subsequently read data stored to adjacent pages 330 until one or both of the thresholds are not satisfied.

In some examples, the memory system controller 315 may use a table (e.g., a page variety table (PVT)) when determining if data stored to a page 330 includes any errors. The memory system controller 315 or another component of the memory system 310 may manage a table that includes values (e.g., a bitmap) indicating whether a particular page 330 is invalid. Accordingly, when a page 330 is invalid, the memory system controller 315 may skip reading the page 330, which may reduce latency of the memory system 310. For example, the memory system controller 315 may determine that data stored to the first page 330-d includes one or more errors and may proceed to reading data from the second page 330-c. The table may indicate that the page 330-c is invalid, thus the memory system controller 315 may refrain from reading the second page 330-c and may proceed to reading data from the page 330-b. In some examples, using the table to skip pages may result in more efficient processing by the memory system 310.

The memory system controller 315 may selectively refresh one or more pages 330 based on the respective first threshold, the respective second threshold, or both being satisfied. During a refresh operation the memory system controller 315 may copy data stored to a respective page 330 of the block 325-a to a page 335 of the block 325-m. For example, the memory system controller 315 may determine whether (e.g. that) respective thresholds of the pages 330-d, 330-c, 330-e, and 330-f are satisfied. Accordingly, the memory system controller 315 may refresh those pages by copying (e.g., reading and subsequently writing) data to pages of the block 325-m. In some examples, the memory system controller 315 may delete the data from the pages 330 within the block 325-a after performing the writing to the block 325-m. Additionally or alternatively, the memory system controller 315 may update a mapping (e.g., a L2P) mapping based on refreshing the one or more pages 330. As described herein, performing refresh operations on the page-level may reduce the latency of the memory system 310 that would otherwise be incurred due to refreshing the entire block 325-a.

In some instances, the memory system controller 315 may refresh a page 330 upon the respective first threshold, the respective second threshold, or both being satisfied. In other instances, the memory system controller 315 may determine which pages 330 to refresh and may refresh the pages during a same operation or during a series of sequential operations. In other examples, when a relatively large quantity of pages is to be refreshed, the memory system controller 315 may postpone the refresh operations for a duration. For example, when the quantity of pages to be refreshed satisfies a third threshold, the memory system controller 315 may postpone refreshing the pages until the host system 305 is idle, until one or more ongoing operations are complete, until maintenance operations are being performed on the memory system 310, or until performing the refresh operations would not otherwise limit the bandwidth of the memory system 310 to perform other types of operations. Accordingly, the memory system 310 may refresh only those pages needing to be refreshed, as opposed to refreshing the entire block 325-a of memory cells, which may improve the overall latency of the memory system 310.

Figure 4:
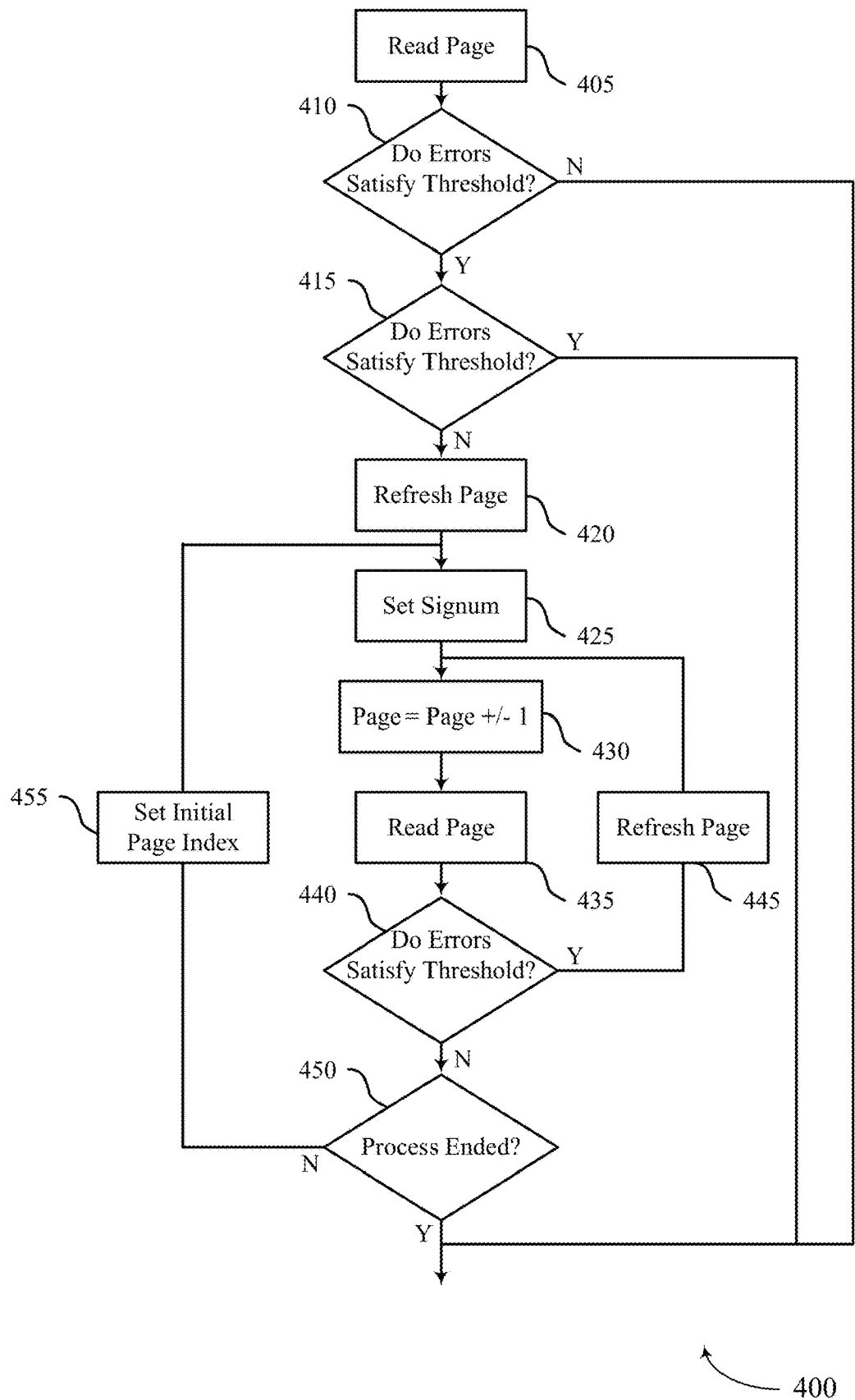
FIG. 4 illustrates an example of a process flow diagram that supports read disturb management for memory in accordance with examples as disclosed herein.

FIG. 4 illustrates an example of a process flow diagram 400 that supports read disturb management for memory in accordance with examples as disclosed herein. In some examples, the process flow diagram 400 may be implemented by one or more aspects of systems 100 and 200. For instance, the process flow diagram 400 may be implemented by a memory system 110 as described with reference to FIG. 1, a memory system 210 as described with reference to FIG. 2, or a memory system 310 as described with reference to FIG. 3. The memory system may be configured to refresh only pages needing to be refreshed, as opposed to refreshing an entire block of memory cells, which may improve the overall latency of the memory system.

Aspects of the process flow diagram 400 may be implemented by a controller (e.g., the memory system controller 315), among other components. Additionally, or alternatively, aspects of the process flow diagram 400 may be implemented as instructions stored in memory (e.g., firmware stored in a memory coupled with a controller). For example, the instructions, in response to being executed by a controller (e.g., the memory system controller 115, 215, or 315), may cause the controller to perform the operation of the process flow diagram 400.

At 405, a first page is read. For example, a controller (e.g., the memory system controller 315 as described with reference to FIG. 3) may read data from a first page (e.g., the first page 330-d) of a virtual block (e.g., the block 325-a) of a memory device.

At 410, a determination regarding errors is made. For example, a memory system controller may determine whether data stored to the first page (e.g., the first page 330-d) of the virtual block includes a quantity of errors that satisfies a first threshold. In some examples, the first threshold may be associated with a bit error rate, a quantity of CECCs, or both.

If, at 410, the memory system controller determines that data stored to the first page of the virtual block does not include a quantity of errors that satisfies the first threshold, the memory system may continue its operations without refreshing any pages, or without determining whether adjacent pages include quantities of errors that satisfy the first threshold.

If, at 410, the memory system controller determines that data stored to the first page of the virtual block includes a quantity of errors that satisfies the first threshold, the memory system controller may determine whether a quantity of access operations (e.g., a quantity of read operations) performed on the page satisfies a second threshold value.

At 415, a determination regarding a quantity of access operations is made. For example, a memory system controller may determine whether a quantity of read operations performed on the first page (e.g., the first page 330-*d*) of the virtual block satisfies a second threshold.

If, at 415, the memory system controller determines that the quantity of access operations performed on the first page of the virtual block does not satisfy the second threshold, the memory system may continue its operations without refreshing any pages.

If, at 415, the controller determines that the quantity of access operations performed on the first page of the virtual block satisfies the second threshold, the memory system controller may refresh the first page (or designate the first page to be refreshed).

At 420, the first page is refreshed. For example, the memory system controller may refresh the first page of the virtual block in response to determining that the quantity of access operations performed on the first page of the virtual block satisfies the second threshold. In other examples the memory system controller may designate the first page to be refreshed at a later time (e.g., after determining whether one or more additional, adjacent pages will be refreshed).

At 425, a signum is set. For example, the memory system controller may set a signum to either "+" or "−", where the signum indicates the direction for the next page to be read (e.g., the next adjacent page 330). That is, "+" may indicate to read a next page following the address of the first page, and a "−" may indicate to read a previous page before the address of the first page. In some examples, the memory system controller may set the signum randomly or based on one or more performance considerations.

At 430, a second page is selected for reading. For example, the memory system controller may select a second page to read using Page=Page [signum] 1. If the memory system controller selects "−" at 425, the memory system controller may select the page previous to the first page (e.g., the page 330-*c*) for reading. If the controller selects "+" at 425, the memory system controller may select the page following the first page (e.g., the page 330-*e*) for reading.

At 435, the second page is read. For example, the memory system controller may read data from a second page (e.g., the first page 330-*c*) of the virtual block of the memory device.

At 440, a determination regarding the first threshold is made. For example, a memory system controller may determine whether data stored to the second page (e.g., the first page 330-*c*) of the virtual block includes a quantity of errors that satisfies the first threshold.

If, at 440, the memory system controller determines that data stored to the second page of the virtual block does not include a quantity of errors that satisfies the first threshold, the memory system may resume operations without refreshing any additional pages, or without determining whether adjacent pages include quantities of errors that satisfy the first threshold.

If, at 440, the memory system controller determines that data stored to the second page of the virtual block includes a quantity of errors that satisfies the first threshold, the memory system controller may refresh the page (or designate the page for refreshing) and may return to 430. In other examples (not shown), the memory system controller may determine whether a quantity of access operations performed on the second page satisfies the second threshold value before proceeding to 450 or 445.

At 445, the second page is refreshed. For example, the memory system controller may refresh the second page of the virtual block in response to determining that the first threshold is satisfied. In other examples the memory system controller may designate the first page to be refreshed at a later time (e.g., after determining whether one or more additional, adjacent pages will be refreshed).

At 450, a determination regarding the end of the read disturb management process is made. For example, the memory system controller may determine whether adjacent pages to the first page, based on the signum, have been read.

If, at 450, the adjacent pages have been read, the memory system may resume operations without refreshing any additional pages, or without determining whether adjacent pages include quantities of errors that satisfy the first threshold.

If, at 450, the adjacent pages have not been read, the process flow may proceed to 455 where the memory system controller may set the initial page index before changing the signum. Accordingly, the memory system may refresh only those pages needing to be refreshed, as opposed to refreshing an entire block of memory cells, which may improve the overall latency of the memory system.

Figure 5:
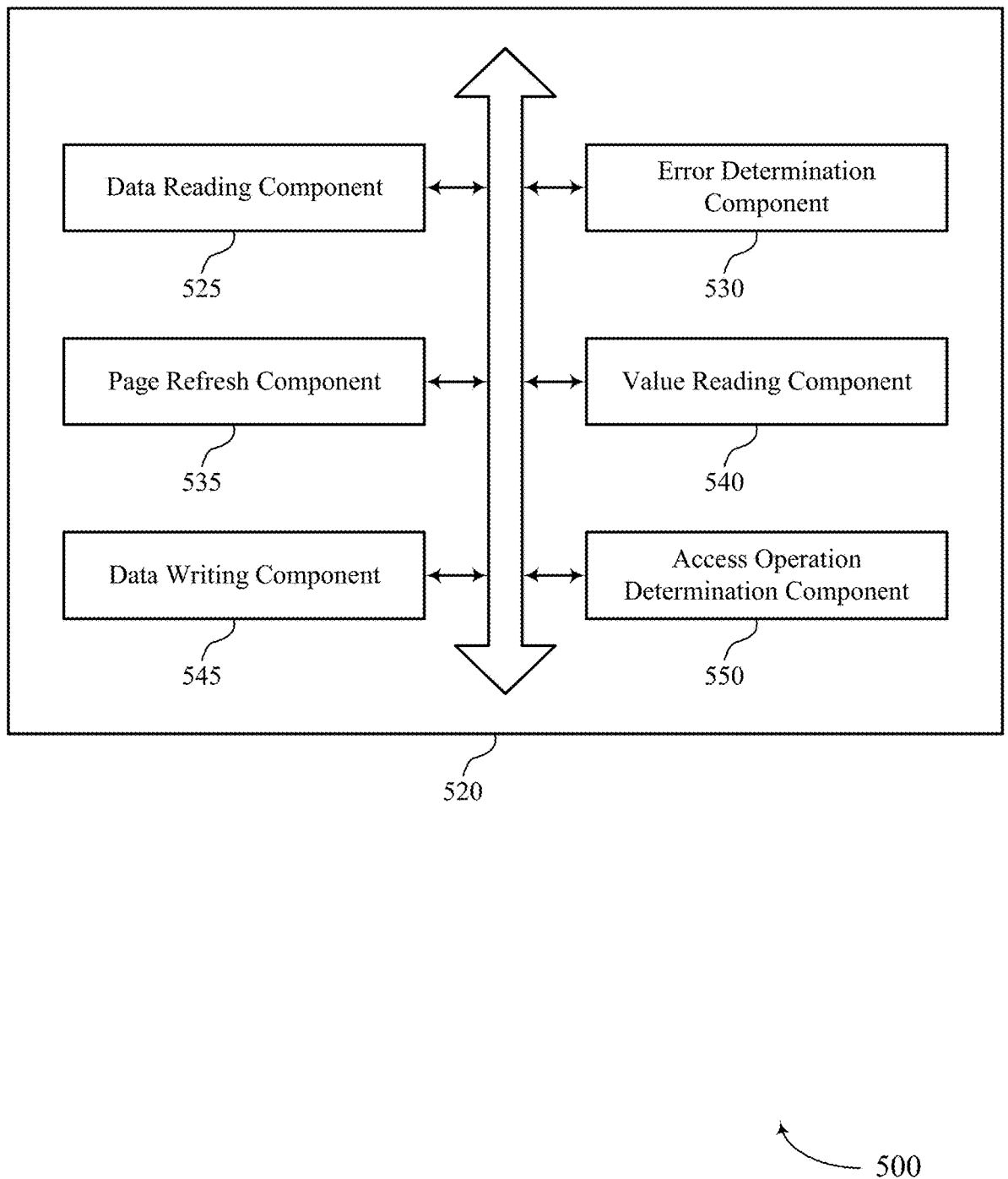
FIG. 5 shows a block diagram of a memory system that supports read disturb management for memory in accordance with examples as disclosed herein.

FIG. 5 shows a block diagram 500 of a memory system 520 that supports read disturb management for memory in accordance with examples as disclosed herein. The memory system 520 may be an example of aspects of a memory system as described with reference to FIGS. 1 through 4. The memory system 520, or various components thereof, may be an example of means for performing various aspects of read disturb management for memory as described herein. For example, the memory system 520 may include a data reading component 525, an error determination component 530, a page refresh component 535, a value reading component 540, a data writing component 545, an access operation determination component 550, or any combination thereof. Each of these components may communicate, directly or indirectly, with one another (e.g., via one or more buses).

The data reading component 525 may be configured as or otherwise support a means for reading data from a first page of a virtual block of a memory device, where the virtual block includes a plurality of pages. The error determination component 530 may be configured as or otherwise support a means for determining whether data stored to a second page of the virtual block includes one or more errors based at least in part on determining that the data read from the first page of the virtual block includes one or more errors. The page refresh component 535 may be configured as or otherwise support a means for refreshing the second page of the virtual block based at least in part on determining that the data stored to the second page of the virtual block includes one or more errors.

In some examples, the page refresh component 535 may be configured as or otherwise support a means for refreshing the first page of the virtual block based at least in part on determining that the data stored to the first page of the virtual block includes one or more errors.

In some examples, the error determination component 530 may be configured as or otherwise support a means for determining that the one or more errors associated with the data stored to the first page of the virtual block satisfies a first threshold, where refreshing the first page of the virtual block is based at least in part on determining that one or more errors associated with the first page of the virtual block satisfies the first threshold.

In some examples, the first threshold is associated with a bit error rate, a quantity of errors, or both.

In some examples, the access operation determination component 550 may be configured as or otherwise support a means for determining that a quantity of access operations performed on the first page of the virtual block satisfies a second threshold, where refreshing the first page of the virtual block is based at least in part on determining that the quantity of access operations performed on the first page of the virtual block satisfies the second threshold.

In some examples, the error determination component 530 may be configured as or otherwise support a means for determining that a plurality of pages of the virtual block include one or more errors based at least in part on refreshing the second page. In some examples, the page refresh component 535 may be configured as or otherwise support a means for postponing, for a duration, refreshing the plurality of pages of the virtual block based at least in part on a quantity of the plurality of pages satisfying a third threshold.

In some examples, the page refresh component 535 may be configured as or otherwise support a means for refreshing, after the duration, the plurality of pages of the virtual block.

In some examples, to support determining whether the data stored to the second page of the virtual block includes one or more errors, the value reading component 540 may be configured as or otherwise support a means for reading a value stored to a component of the memory device, where the value indicates whether the data stored to the second page of the virtual block includes one or more errors.

In some examples, to support refreshing the second page of the virtual block, the data reading component 525 may be configured as or otherwise support a means for reading the data from the second page of the virtual block of the memory device based at least in part on determining that the data read from the second page of the virtual block includes one or more errors. In some examples, to support refreshing the second page of the virtual block, the data writing component 545 may be configured as or otherwise support a means for writing the data associated with the second page of the virtual block to a third page of a second virtual block.

In some examples, the page refresh component 535 may be configured as or otherwise support a means for refraining from refreshing the second page of the virtual block based at least in part on determining that the data stored to the second page of the virtual block includes a quantity of errors that does not satisfy a first threshold.

In some examples, the first page is adjacent to the second page.

In some examples, the error determination component 530 may be configured as or otherwise support a means for determining that data stored to a third page of the virtual block includes one or more errors based at least in part on determining that the data read from the second page of the virtual block includes one or more errors. In some examples, the page refresh component 535 may be configured as or otherwise support a means for refreshing the third page of the virtual block based at least in part on determining that the data stored to the third page of the virtual block includes one or more errors.

In some examples, the error determination component 530 may be configured as or otherwise support a means for determining that data stored to a fourth page of the virtual block includes a bit error rate that satisfies a third threshold. In some examples, the page refresh component 535 may be configured as or otherwise support a means for refreshing the fourth page of the virtual block based at least in part on determining that the bit error rate satisfies the third threshold.

In some examples, the error determination component 530 may be configured as or otherwise support a means for determining that data stored to a fifth page of the virtual block includes a bit error rate that does not satisfy the third threshold, where the fifth page is adjacent to the fourth page.

In some examples, the page refresh component 535 may be configured as or otherwise support a means for refraining from refreshing the fifth page of the virtual block based at least in part on determining that the bit error rate does not satisfy the third threshold.

In some examples, the data reading component 525 may be configured as or otherwise support a means for reading the data from the second page of the virtual block of the memory device based at least in part on determining that the data read from the first page of the virtual block includes one or more errors, where determining whether the data stored to the second page of the virtual block includes one or more errors is based at least in part on reading the data from the second page of the virtual block of the memory device.

In some examples, the error determination component 530 may be configured as or otherwise support a means for determining whether the data read from the first page of the virtual block includes one or more errors based at least in part on reading the data from the first page, where determining whether the data stored to a second page of the virtual block includes one or more errors based at least in part on determining that the data read from the first page of the virtual block includes one or more errors.

Figure 6:
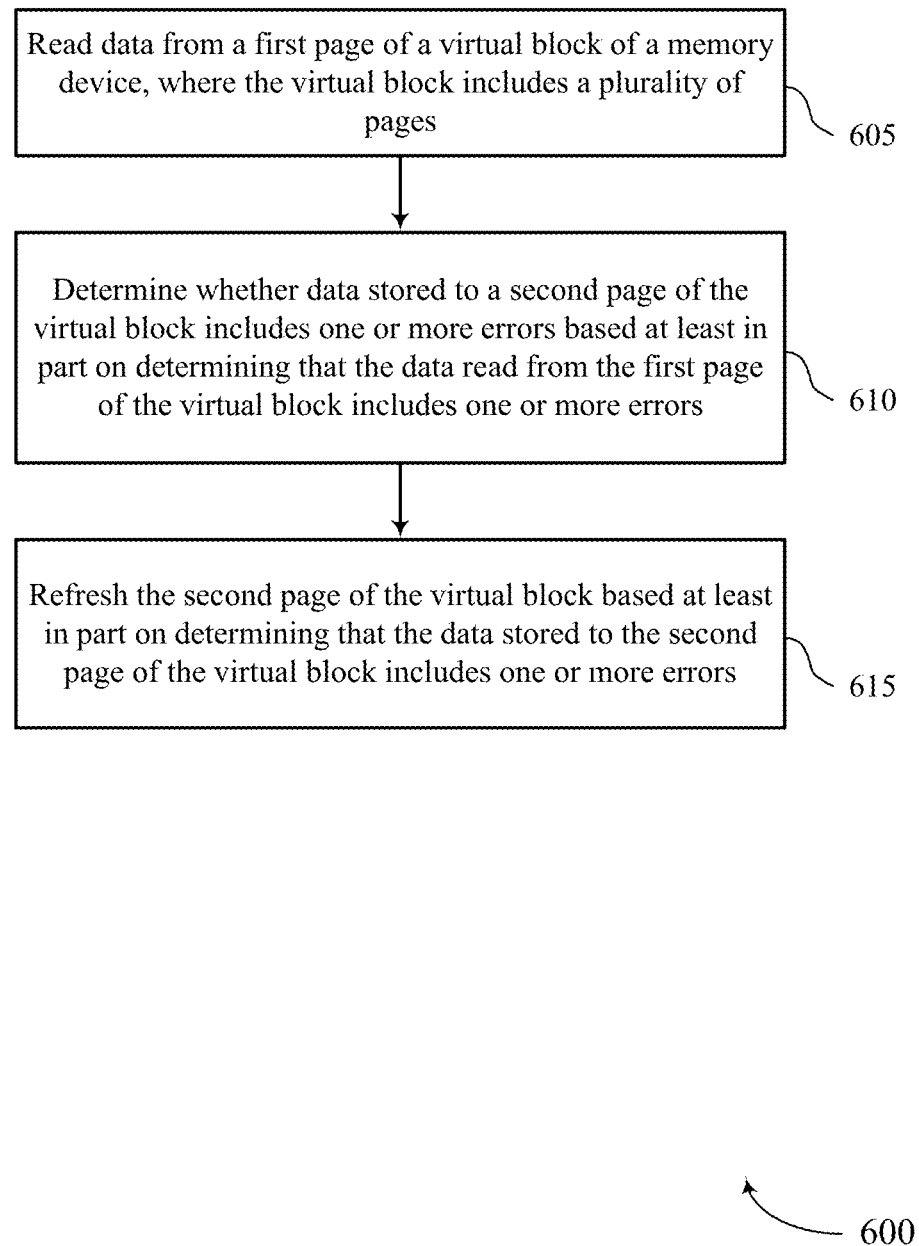
FIG. 6 shows a flowchart illustrating a method or methods that support read disturb management for memory in accordance with examples as disclosed herein.

FIG. 6 shows a flowchart illustrating a method 600 that supports read disturb management for memory in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include reading data from a first page of a virtual block of a memory device, where the virtual block includes a plurality of pages. The operations of 605 may be performed in accordance with examples as disclosed herein. In some examples, aspects of the operations of 605 may be performed by a data reading component 525 as described with reference to FIG. 5.

At 610, the method may include determining whether data stored to a second page of the virtual block includes one or more errors based at least in part on determining that the data read from the first page of the virtual block includes one or more errors. The operations of 610 may be performed in accordance with examples as disclosed herein. In some examples, aspects of the operations of 610 may be performed by an error determination component 530 as described with reference to FIG. 5.

At 615, the method may include refreshing the second page of the virtual block based at least in part on determining that the data stored to the second page of the virtual block includes one or more errors. The operations of 615 may be performed in accordance with examples as disclosed herein. In some examples, aspects of the operations of 615 may be performed by a page refresh component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing code including instructions executable by a processor of an electronic device), or any combination thereof for performing the following aspects of the present disclosure:

Aspect 1: A method, apparatus, or non-transitory computer-readable medium including operations, features, circuitry, logic, means, or instructions, or any combination thereof for reading data from a first page of a virtual block of a memory device, where the virtual block includes a plurality of pages; determining whether data stored to a second page of the virtual block includes one or more errors based at least in part on determining that the data read from the first page of the virtual block includes one or more errors; and refreshing the second page of the virtual block based at least in part on determining that the data stored to the second page of the virtual block includes one or more errors.

Aspect 2: The method, apparatus, or non-transitory computer-readable medium of aspect 1, further including operations, features, circuitry, logic, means, or instructions, or any combination thereof for refreshing the first page of the virtual block based at least in part on determining that the data stored to the first page of the virtual block includes one or more errors.

Aspect 3: The method, apparatus, or non-transitory computer-readable medium of aspect 2, further including operations, features, circuitry, logic, means, or instructions, or any combination thereof for determining that the one or more errors associated with the data stored to the first page of the virtual block satisfies a first threshold, where refreshing the first page of the virtual block is based at least in part on determining that one or more errors associated with the first page of the virtual block satisfies the first threshold.

Aspect 4: The method, apparatus, or non-transitory computer-readable medium of aspect 3, where the first threshold is associated with a bit error rate, a quantity of errors, or both.

Aspect 5: The method, apparatus, or non-transitory computer-readable medium of any of aspects 2 through 4, further including operations, features, circuitry, logic, means, or instructions, or any combination thereof for determining that a quantity of access operations performed on the first page of the virtual block satisfies a second threshold, where refreshing the first page of the virtual block is based at least in part on determining that the quantity of access operations performed on the first page of the virtual block satisfies the second threshold.

Aspect 6: The method, apparatus, or non-transitory computer-readable medium of any of aspects 1 through 5, further including operations, features, circuitry, logic, means, or instructions, or any combination thereof for determining that a plurality of pages of the virtual block include one or more errors based at least in part on refreshing the second page and postponing, for a duration, refreshing the plurality of pages of the virtual block based at least in part on a quantity of the plurality of pages satisfying a third threshold.

Aspect 7: The method, apparatus, or non-transitory computer-readable medium of aspect 6, further including operations, features, circuitry, logic, means, or instructions, or any combination thereof for refreshing, after the duration, the plurality of pages of the virtual block.

Aspect 8: The method, apparatus, or non-transitory computer-readable medium of any of aspects 1 through 7, where determining whether the data stored to the second page of the virtual block includes one or more errors includes operations, features, circuitry, logic, means, or instructions, or any combination thereof for reading a value stored to a component of the memory device, where the value indicates whether the data stored to the second page of the virtual block includes one or more errors.

Aspect 9: The method, apparatus, or non-transitory computer-readable medium of any of aspects 1 through 8, where refreshing the second page of the virtual block includes operations, features, circuitry, logic, means, or instructions, or any combination thereof for reading the data from the second page of the virtual block of the memory device based at least in part on determining that the data read from the second page of the virtual block includes one or more errors and writing the data associated with the second page of the virtual block to a third page of a second virtual block.

Aspect 10: The method, apparatus, or non-transitory computer-readable medium of any of aspects 1 through 9, further including operations, features, circuitry, logic, means, or instructions, or any combination thereof for refraining from refreshing the second page of the virtual block based at least in part on determining that the data stored to the second page of the virtual block includes a quantity of errors that does not satisfy a first threshold.

Aspect 11: The method, apparatus, or non-transitory computer-readable medium of any of aspects 1 through 10, where the first page is adjacent to the second page.

Aspect 12: The method, apparatus, or non-transitory computer-readable medium of any of aspects 1 through 11, further including operations, features, circuitry, logic, means, or instructions, or any combination thereof for determining that data stored to a third page of the virtual block includes one or more errors based at least in part on determining that the data read from the second page of the virtual block includes one or more errors and refreshing the third page of the virtual block based at least in part on determining that the data stored to the third page of the virtual block includes one or more errors.

Aspect 13: The method, apparatus, or non-transitory computer-readable medium of any of aspects 1 through 12, further including operations, features, circuitry, logic, means, or instructions, or any combination thereof for determining that data stored to a fourth page of the virtual block includes a bit error rate that satisfies a third threshold and refreshing the fourth page of the virtual block based at least in part on determining that the bit error rate satisfies the third threshold.

Aspect 14: The method, apparatus, or non-transitory computer-readable medium of aspect 13, further including operations, features, circuitry, logic, means, or instructions, or any combination thereof for determining that data stored to a fifth page of the virtual block includes a bit error rate that does not satisfy the third threshold, where the fifth page is adjacent to the fourth page and refraining from refreshing the fifth page of the virtual block based at least in part on determining that the bit error rate does not satisfy the third threshold.

Aspect 15: The method, apparatus, or non-transitory computer-readable medium of any of aspects 1 through 14, further including operations, features, circuitry, logic, means, or instructions, or any combination thereof for reading the data from the second page of the virtual block of the memory device based at least in part on determining that the data read from the first page of the virtual block includes one or more errors, where determining whether the data stored to the second page of the virtual block includes one or more errors is based at least in part on reading the data from the second page of the virtual block of the memory device.

Aspect 16: The method, apparatus, or non-transitory computer-readable medium of any of aspects 1 through 15, further including operations, features, circuitry, logic, means, or instructions, or any combination thereof for determining whether the data read from the first page of the virtual block includes one or more errors based at least in part on reading the data from the first page, where determining whether the data stored to a second page of the virtual block includes one or more errors based at least in part on determining that the data read from the first page of the virtual block includes one or more errors.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A memory system, comprising:
one or more memory devices; and
processing circuitry coupled with the one or more memory devices and configured to cause the memory system to:

read data from a first page of a virtual block of the one or more memory devices, wherein the virtual block comprises a plurality of pages that comprises the first page and a second page;

determine whether data stored to the second page of the virtual block comprises one or more errors based at least in part on determining that the data read from the first page of the virtual block comprises one or more errors, wherein the one or more errors of the second page are associated with a shift in a threshold voltage of one or more memory cells of the second page, wherein the shift in the threshold voltage is based at least in part on reading the data from the first page;

determine that data stored to the plurality of pages of the virtual block comprise one or more errors based at least in part on determining that the data stored to the second page of the virtual block comprises one or more errors, wherein the plurality of pages comprise the second page;

postpone refreshing the plurality of pages of the virtual block based at least in part on a quantity of the plurality of pages satisfying a threshold quantity of pages; and refresh the second page of the virtual block based at least in part on postponing refreshing the plurality of pages of the virtual block.

2. The memory system of claim 1, wherein the processing circuitry is further configured to cause the memory system to:

refresh the first page of the virtual block based at least in part on determining that the data stored to the first page of the virtual block comprises one or more errors.

3. The memory system of claim 2, wherein the processing circuitry is further configured to cause the memory system to:

determine that the one or more errors associated with the data stored to the first page of the virtual block satisfies a first threshold, wherein refreshing the first page of the virtual block is based at least in part on determining that one or more errors associated with the first page of the virtual block satisfies the first threshold.

4. The memory system of claim 3, wherein the first threshold is associated with a bit error rate, a quantity of errors, or both.

5. The memory system of claim 2, wherein the processing circuitry is further configured to cause the memory system to:

determine that a quantity of access operations performed on the first page of the virtual block satisfies a second threshold, wherein refreshing the first page of the virtual block is based at least in part on determining that the quantity of access operations performed on the first page of the virtual block satisfies the second threshold.

6. The memory system of claim 1, wherein the processing circuitry is further configured to cause the memory system to:

refresh, after postponing refreshing the plurality of pages of the virtual block, the plurality of pages of the virtual block.

7. The memory system of claim 1, wherein determining whether data stored to the second page of the virtual block comprises one or more errors comprises the processing circuitry configured to cause the memory system to:

read a value stored to a component of the one or more memory devices, wherein the value indicates whether the data stored to the second page of the virtual block comprises one or more errors.

8. The memory system of claim 1, wherein refreshing the second page of the virtual block comprises the processing circuitry configured to cause the memory system to:

read the data from the second page of the virtual block based at least in part on determining that the data read from the second page of the virtual block comprises one or more errors; and write the data associated with the second page of the virtual block to a third page of a second virtual block.

9. The memory system of claim 1, wherein the processing circuitry is further configured to cause the memory system to:

refrain from refreshing a third page of the virtual block based at least in part on determining that data stored to the third page of the virtual block does not comprise one or more errors.

10. The memory system of claim 9, wherein:
the first page is adjacent to the second page.

11. The memory system of claim 10, wherein the processing circuitry is further configured to cause the memory system to:

refrain from refreshing a fourth page of the virtual block based at least in part on determining that data stored to the fourth page does not comprise one or more errors, wherein the fourth page is adjacent to the first page, and wherein refraining from refreshing the fourth page is based at least in part on determining that the fourth page does not comprise one or more errors after correcting one or more errors of the first page and the second page.

12. The memory system of claim 1, wherein the processing circuitry is further configured to cause the memory system to:

determine that data stored to a third page of the virtual block comprises one or more errors based at least in part on determining that the data read from the second page of the virtual block comprises one or more errors; and refresh the third page of the virtual block based at least in part on determining that the data stored to the third page of the virtual block comprises one or more errors.

13. The memory system of claim 1, wherein the processing circuitry is further configured to cause the memory system to:

determine that data stored to a fourth page of the virtual block comprises a bit error rate that satisfies a third threshold; and refresh the fourth page of the virtual block based at least in part on determining that the bit error rate satisfies the third threshold.

14. The memory system of claim 13, wherein the processing circuitry is further configured to cause the memory system to:

determine that data stored to a fifth page of the virtual block comprises a bit error rate that does not satisfy the third threshold, wherein the fifth page is adjacent to the fourth page; and refrain from refreshing the fifth page of the virtual block based at least in part on determining that the bit error rate of the fifth page of the virtual block does not satisfy the third threshold.

15. The memory system of claim 1, wherein the processing circuitry is further configured to cause the memory system to:

read the data from the second page of the virtual block based at least in part on determining that the data read from the first page of the virtual block comprises one or more errors, wherein determining whether the data stored to the second page of the virtual block comprises one or more errors is based at least in part on reading the data from the second page of the virtual block.

16. The memory system of claim 1, wherein the processing circuitry is further configured to cause the memory system to:
determine that the data read from the first page of the virtual block comprises one or more errors based at least in part on reading the data from the first page, wherein determining whether the data stored to the second page of the virtual block comprises one or more errors is based at least in part on determining that the data read from the first page of the virtual block comprises one or more errors.

17. A non-transitory computer-readable medium storing code comprising instructions which, when executed by processing circuitry of an electronic device, cause the electronic device to:
read data from a first page of a virtual block of one or more memory devices, wherein the virtual block comprises a plurality of pages that comprises the first page and a second page;
determine whether data stored to the second page of a virtual block comprises one or more errors based at least in part on determining that the data read from the first page of the virtual block comprises one or more errors, wherein the one or more errors of the second page are associated with a shift in a threshold voltage of one or more memory cells of the second page, wherein the shift in the threshold voltage is based at least in part on reading the data from the first page;
determine that data stored to the plurality of pages of the virtual block comprise one or more errors based at least in part on determining that the data stored to the second page of the virtual block comprises one or more errors, wherein the plurality of pages comprise the second page;
postpone refreshing the plurality of pages of the virtual block based at least in part on a quantity of the plurality of pages satisfying a threshold quantity of pages; and
refresh the second page of the virtual block based at least in part on postponing refreshing the plurality of pages of the virtual block.

18. The non-transitory computer-readable medium of claim 17, wherein the instructions, when executed by the processing circuitry of the electronic device, further cause the electronic device to:
refresh the first page of the virtual block based at least in part on determining that the data stored to the first page of the virtual block comprises one or more errors.

19. The non-transitory computer-readable medium of claim 18, wherein the instructions, when executed by the processing circuitry of the electronic device, further cause the electronic device to:
determine that the one or more errors associated with the data stored to the first page of the virtual block satisfies a first threshold, wherein refreshing the first page of the virtual block is based at least in part on determining that one or more errors associated with the first page of the virtual block satisfies the first threshold.

20. The non-transitory computer-readable medium of claim 17, wherein the instructions, when executed by the processing circuitry of the electronic device, further cause the electronic device to:
refrain from refreshing a third page of the virtual block based at least in part on determining that data stored to the third page of the virtual block does not comprise one or more errors.

21. A method by a memory system, comprising:
reading data from a first page of a virtual block of one or more memory devices, wherein the virtual block comprises a plurality of pages that comprises the first page and a second page;
determining whether data stored to the second page of the virtual block comprises one or more errors based at least in part on determining that the data read from the first page of the virtual block comprises one or more errors, wherein the one or more errors of the second page are associated with a shift in a threshold voltage of one or more memory cells of the second page, wherein the shift in the threshold voltage is based at least in part on reading the data from the first page;
determining that data stored to the plurality of pages of the virtual block comprise one or more errors based at least in part on determining that the data stored to the second page of the virtual block comprises one or more errors, wherein the plurality of pages comprise the second page;
postponing refreshing the plurality of pages of the virtual block based at least in part on a quantity of the plurality of pages satisfying a threshold quantity of pages; and
refreshing the second page of the virtual block based at least in part on postponing refreshing the plurality of pages of the virtual block.

22. The method of claim 21, further comprising:
refraining from refreshing a third page of the virtual block based at least in part on determining that data stored to the third page of the virtual block does not comprise one or more errors.

* * * * *